Figure 1:
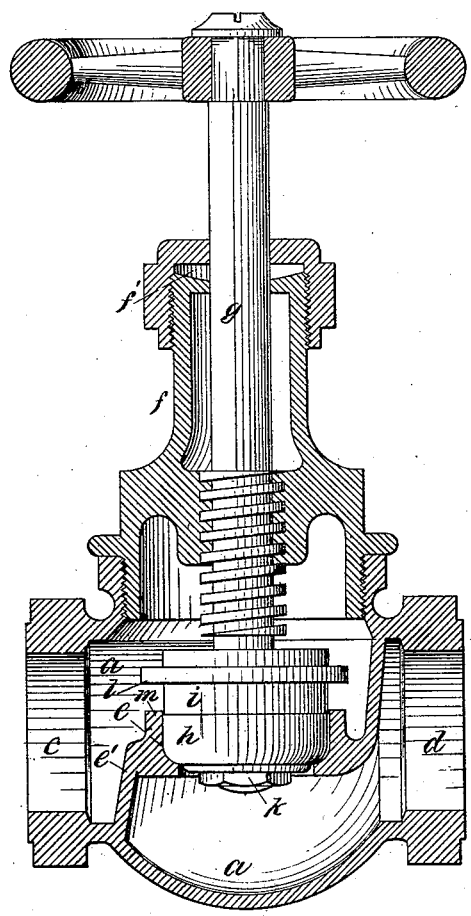

(No Model.)

M. MICKELBOROUGH.
VALVE.

No. 256,237. Patented Apr. 11, 1882.

Witnesses:
C. C. Perkins
Frank A. Meade

Inventor:
M. Mickelborough
by Chas. M. Higgins
Attorney

UNITED STATES PATENT OFFICE.

MATTHEW MICKELBOROUGH, OF BROOKLYN, NEW YORK.

VALVE.

SPECIFICATION forming part of Letters Patent No. 256,237, dated April 11, 1882.

Application filed November 22, 1881. (No model.)

*To all whom it may concern:*

Be it known that I, MATTHEW MICKELBOROUGH, of Brooklyn, Kings county, New York, have invented certain new and useful Improvements in Valves, of which the following is a specification.

My invention relates to that class of valves frequently termed "compression," and more especially intended for steam, which employ a flexible or slightly-flexible valve-disk, which is screwed against a metallic valve seat or socket. The flexible disk, which is generally made of a hard composition of vulcanized rubber and plumbago, is liable, when heated by the steam and pressed to its seat, to "squash" or become misshapen, and several devices have been used to so protect the disk as to prevent squashing, yet allow the disk to freely adapt itself to its seat, and also to allow the disk to feed up to the seat as wear takes place. The form of the disk has been most commonly flat to meet with a flat seat, but sometimes has been conical to meet with a conical seat. In one case the flat disk is arranged to enter a cylindrical socket having a flat seating-shoulder at the base, while in other cases the cylindrical socket is dispensed with, and the flat disk seats directly on an extended flat seat. In the latter case a loose metal sleeve has been placed around the disk, which prevents its spreading or squashing, and allows the disk to adapt itself to the seat each time it is forced against the same or as wear takes place. Such sleeves, however, are sometimes liable to be displaced by the pressure of the steam, thus leaving the disk unprotected. Furthermore, these flexible disks may sometimes become seriously misshapen or greatly worn before the engineer can become aware of it, thus rendering the valve suddenly useless to control the flow of steam, and this may occur at a time when it is impossible to immediately repair it, and particularly where the valve is used in localities remote from steam-fitters or bases of supplies.

Now, one important feature of my invention consists in the combination, with an exposed flexible disk and its seating-socket, of a secondary metallic ground disk or valve rim and a corresponding ground lip or rim on the valve-socket, which, when the flexible disk becomes seriously injured or entirely worn out, meet together and form a perfectly-tight joint, which renders the valve perfectly operative as long as desired, or until the flexible disk can be conveniently renewed.

Another feature of my invention consists in making the flexible valve-disk in a cylindrical form with a rounded or hemispherical corner at the base to match with a similarly-formed valve seat or socket, which constitutes a material improvement over the ordinary conical form in that the disk is caused to mold or adapt itself to its seat at each action in a much more easy and perfect manner, and squashing out is more effectually prevented, as hereinafter fully set forth.

Figure 2:
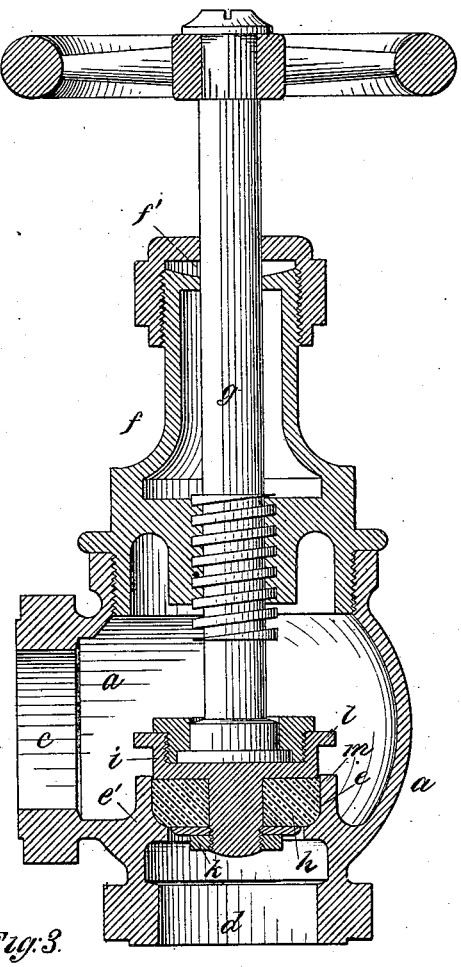
Figure 3:
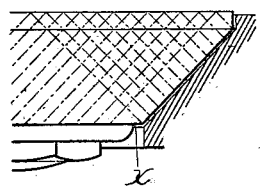
Figure 3:
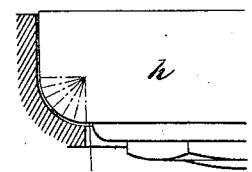

In the annexed drawings, Figure 1 presents a sectional elevation of an ordinary steam globe-valve provided with my improvement, the valve-disk and follower appearing in elevation. Fig. 2 presents a similar view of an ordinary angle-valve, showing the disk and follower in section. Fig. 3 shows diagrams illustrating the difference of action between the usual conical form of disk and my improved rounded disk, as hereinafter described.

In the drawings, $a$ indicates the globe or casing of the valve, and $c$ $d$ the inlet and outlet thereof.

$e$ indicates the valve-seat in the partition $e'$ across the globe, as usual.

$f$ represents the neck of the valve and $f'$ the gland.

$g$ indicates the valve-stem, which is surmounted with the usual hand-wheel and passes through the gland, and is threaded near its lower end to screw through the threaded aperture in the base of the neck $f$ in the usual manner, as illustrated. On the lower extremity of the stem is swiveled the valve plunger or disk, which is adapted to move to or from the seat on the partition $e'$, accordingly as the stem is screwed in or out, as usual.

Now, $h$ indicates the flexible valve-disk, which, according to my improvement, is made in straight cylindrical form, with its base or lower corner rounded in a true circular, or nearly circular, form, rendering the lower or seating end of the disk proximately hemispherical, while its main or upper portion is cylindrical.

The seat or socket $e$ for the valve-disk corresponds exactly in form with the disk, being cylindrically straight on its sides and circularly rounded on its lower corner or base, forming a rounded shoulder for the round-cornered disk, as well shown in the drawings.

The disk $h$ is attached to the disk holder or follower $i$, as shown best in Fig. 2, being held between the flat base of the cylindrical body $i$ of the follower and a nut (or nut and washer) $k$, screwed onto the central stem of the follower, which nut nearly fills the lower aperture of the valve-seat and covers almost the entire base of the disk, excluding the rounded corner thereof, thus effectually embracing and protecting the disk.

The upper end of the follower $i$ is cupped and threaded, as seen best in Fig. 2, and the shouldered lower end of the valve-stem bears flatly against the same, while an annular screw or nut, $n$, is screwed into the top of the follower against the shoulder of the stem, thereby forming a swiveled connection of the follower and disk with the stem, which permits the stem to turn when the valve is screwed to its seat, but prevents the turning of the follower or disk when the latter is once brought to its seat, in the usual manner.

Now, the body of the follower $i$ immediately above the disk is made straight and cylindrical and of the same diameter as the disk, and in length equal to the straight cylindrical portion of the disk, and is, moreover, a nice fit for the cylindrical portion of the socket $e$. It will therefore be seen that the disk $h$ has a range of wear equal to the length of its straight cylindrical portion, and that as the disk becomes worn the follower $i$ descends proportionately in the cylindrical socket $e$ until it arrives as far as the rounded seat of the socket, when the limit of the disk's wear is reached. Now, at this point it will be observed that a projecting annular rim, $l$, on the follower $i$ will meet with the lip $m$ of the socket, the meeting surfaces of which are, according to my invention, nicely ground and preferably flat, thereby forming a perfectly-tight valve-joint, although the flexible disk $h$ be worn out, and thus enabling the functions of the valve to be continued in a perfectly safe and convenient manner until the flexible disk can be conveniently renewed, which forms an important advantage of my invention. It will also be seen that by this construction, should the disk $h$ become suddenly misshapen or injured by any cause before it has reached the limit of its wear, then by forcibly screwing down the valve-stem the injured and now comparatively soft disk will be cut or squeezed out of the way and the ground surfaces $l$ $m$ brought to a seat, thus forming a safety device which renders the valve operative under almost any circumstances.

With the above-named features of my invention a disk of any of the usual shapes having a certain range of wear may be used; but I greatly prefer the cylindrical form with rounded base, as before described, and illustrated in Figs. 1 and 2, as this form I find to possess many practical advantages. Thus when the disk is made in this form I find that it molds or adapts itself at each action more perfectly, so as to perfectly remold a new smooth spherical face upon the composition disk whenever it becomes impaired by the action of the steam upon it, and this it does with less tendency to squash out, but with a better tendency to spread in and fill the seat or socket without causing injurious strain or wear on the texture or material of the disk. This will be rendered evident by considering the diagrams in Fig. 3, which contrast the more common conical disk with my improved disk. For instance, when the conical disk is forced to its seat the compressive strain on the disk, or, rather, the reaction from this compression, may be said to act in lines at right angles from the sides of the cone toward the rigid base of the disk holder or follower, which lines will thence become reflected at the opposite inclination downward, as illustrated. Hence in this case the lines of incidence and of reflection tend to cross each other in the material of the disk, and thus act to cause a greater motion and friction of the particles, which tends to wear or disintegrate the material more rapidly. Moreover, the resultant effect of these lines of force seems to be to squash or force the material toward the lower corner, $x$, of the disk, giving the disk greater tendency to squash out here.

Now, in my improved form of disk it will be seen that the lines of compression radiate to a center, and that the material tends to spring back on the same lines—that is, the lines of incidence and reflection or of compression and expansion in my disk are the same, thus subjecting the particles to less stress and movement, and, moreover, tending to cause the greatest swelling or expansion of the material in the round corner of the socket, which makes the valve much tighter and greatly reduces the tendency of the material to squash out at the necessarily unprotected point $x$.

It may be noted from Fig. 2 that when the disk $n$ comes to its seat the follower $i$ enters the socket, thereby preventing the upward escape of the disk, and completely inclosing and protecting the disk in its socket and compelling it to expand within and assume a perfectly-tight fit for the socket.

It is not absolutely necessary that the surfaces $l$ and $m$ be always ground, as they may be provided with some suitable packing not liable to be injured by the constant action of steam. For instance, these surfaces might be faced with soft metal; or one surface might be simply turned off true and a soft-copper ring applied to the other surface, which construction would insure a tight joint. The ground joint, however, is preferred.

I do not wish to be understood as limiting myself to the precise details of construction described, as these, of course, may be varied without departing from the essential features of my invention.

I am aware that a valve has been heretofore made with a primary flexible disk and corresponding seat, with a secondary metallic valve-rim on the holder of the disk, which met with a secondary seat around the primary seat when the flexible disk became exhausted; but in that case the flexible disk was inclosed around its sides in a socket in the disk-holder and its under side seated upon a sharp raised annular valve seat or rim, while the lower edge of the metallic disk-holder was adapted to seat around the base of the raised rim when the flexible disk was worn out. Hence in that case the primary valve-seat was a raised edge instead of a depressed socket, as in my case, while the secondary seat was depressed around the base of the primary seat. Consequently worn particles from the disk and rust or other matter from the valve or pipes has free chance to lodge and accumulate on the secondary seat, rendering the secondary seating action inoperative when required, whereas in my case the secondary seat is raised and isolated and cannot afford a lodgment for such matter, and is, moreover, kept constantly clean by the current of steam which will blow over it as soon as the disk is raised out of its socket, as will be readily appreciated, thereby presenting an important practical improvement in this class of valves.

I claim—

1. A valve substantially as described, constructed with a valve-plunger provided with a primary valve-disk, $h$, exposed around its sides, and having a definite depth and range of wear, in combination with a valve-seat having a deep depressed cavity or socket to receive and envelop the said disk, and with a secondary seat around the edge of said socket to meet with a secondary valve-rim on the holder of said disk when the latter reaches the limit of its wear in the primary seat, substantially as herein shown and described.

2. The combination, in a valve of substantially the described kind, of a valve-seat formed with a deep depressed seat or socket, $e$, forming a primary valve-seat and a raised secondary annular seat, $m$, around the edge of said socket, with a valve-plunger provided with a deep exposed disk, $h$, to enter said socket and a secondary valve-rim, $l$, to meet with the raised and isolated seat $m$ when the primary disk reaches the limit of its wear in the primary seat or socket, substantially as and for the purpose set forth.

3. The combination, in a valve of substantially the described kind, with a flexible or wearable disk having a definite depth and range of wear, and with a corresponding deep seat or socket therefor, of a disk holder or follower to which said disk is attached, adapted to enter said socket as wear takes place, with the secondary valve-rim $l$ upon said follower, and a corresponding lip or seat, $m$, on said socket adapted to meet together and form a tight joint when the primary disk reaches the limit of its wear, substantially as herein shown and described.

4. A valve of substantially the described kind, constructed with a flexible non-metallic wearable disk of straight cylindrical form with its lower corner or seating base rounded and with a seat or socket of corresponding form, substantially as and for the purpose set forth.

5. The combination, in a valve of substantially the described kind, of a flexible or non-metallic valve-disk of cylindrical form having a rounded base with a corresponding seat or socket, with a disk holder or follower having a cylindrical form corresponding to the straight portion of said disk and socket and of a length equal to the straight portion of the disk and socket, or nearly so, substantially as and for the purpose set forth.

M. MICKELBOROUGH.

Witnesses:
CHAS. M. HIGGINS,
E. C. PERKINS.